United States Patent
Yamazaki et al.

(10) Patent No.: US 9,204,392 B2
(45) Date of Patent: Dec. 1, 2015

(54) MOBILE COMMUNICATION METHOD AND RADIO TERMINAL

(75) Inventors: Chiharu Yamazaki, Yokohama (JP); Masato Fujishiro, Yokohama (JP); Noriyoshi Fukuta, Yokohama (JP); Hiroyuki Adachi, Yokohama (JP); Atsuhisa Inakoshi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 70 days.

(21) Appl. No.: 13/438,650

(22) Filed: Apr. 3, 2012

(65) Prior Publication Data

US 2012/0257557 A1    Oct. 11, 2012

Related U.S. Application Data

(60) Provisional application No. 61/471,315, filed on Apr. 4, 2011.

(51) Int. Cl.
*H04W 52/02* (2009.01)

(52) U.S. Cl.
CPC .................... *H04W 52/0229* (2013.01)

(58) Field of Classification Search
USPC ............... 370/252, 311, 340; 455/574
See application file for complete search history.

(56) References Cited

U.S. PATENT DOCUMENTS

| | | | | |
|---|---|---|---|---|
| 8,169,957 B2 * | 5/2012 | Damnjanovic | ............... | 370/329 |
| 8,351,922 B2 * | 1/2013 | Wang et al. | ............... | 455/423 |
| 8,432,818 B2 * | 4/2013 | Cai et al. | ............... | 370/252 |
| 8,462,736 B2 * | 6/2013 | Kazmi et al. | ............... | 370/332 |
| 8,509,784 B2 * | 8/2013 | Masuda et al. | ............... | 455/443 |
| 2008/0085710 A1 * | 4/2008 | Prateek | ............... | 455/436 |
| 2008/0186892 A1 | 8/2008 | Damnjanovic | | |
| 2010/0142485 A1 * | 6/2010 | Lee et al. | ............... | 370/331 |
| 2010/0178895 A1 | 7/2010 | Maeda et al. | | |
| 2010/0290509 A1 | 11/2010 | Dalsgaard et al. | | |
| 2010/0323683 A1 | 12/2010 | Kazmi et al. | | |

(Continued)

FOREIGN PATENT DOCUMENTS

| | | |
|---|---|---|
| JP | H10-135893 A | 5/1998 |
| JP | 2001-086553 A | 3/2001 |
| JP | 2008-211453 A | 9/2008 |
| JP | 2008-211628 A | 9/2008 |

(Continued)

OTHER PUBLICATIONS

3GPP TS 36.321 V10.0.0 (Dec. 2010); 3rd Generation Partnership Project; Technical Specification Group Radio Access Network; Evolved Universal Terrestrial Radio Access (E-UTRA); Medium Access Control (MAC) protocol specification (Release 10).

(Continued)

*Primary Examiner* — Anh-Vu Ly
*Assistant Examiner* — Abdullahi Ahmed
(74) *Attorney, Agent, or Firm* — Studebaker & Brackett PC

(57) ABSTRACT

A mobile communication method, which configures a DRX cycle having an On duration in which a downlink signal transmitted from a serving base station is to be monitored and an Off duration other than the On duration in an RRC connected state where an RRC connection is established between a radio terminal and a radio base station, the mobile communication method comprising: a step A of transmitting, from the radio base station to the radio terminal, a paging signal for notifying the radio terminal of an incoming call to the radio terminal at a predetermined timing in the Off duration when the DRX cycle is configured; and a step B of monitoring, at the radio terminal, the paging signal at a predetermined timing in the Off duration when the DRX cycle is configured.

6 Claims, 6 Drawing Sheets

(56) References Cited

U.S. PATENT DOCUMENTS

| | | | |
|---|---|---|---|
| 2011/0002281 | A1 | 1/2011 | Terry et al. |
| 2011/0188440 | A1 | 8/2011 | Wang |
| 2012/0033595 | A1* | 2/2012 | Aoyama et al. ............... 370/311 |
| 2012/0052860 | A1 | 3/2012 | Faronius |
| 2012/0127934 | A1* | 5/2012 | Anderson et al. ............ 370/329 |

FOREIGN PATENT DOCUMENTS

| | | |
|---|---|---|
| JP | 2010-226746 A | 10/2010 |
| JP | 2010-259112 A | 11/2010 |
| WO | 2009/088496 A1 | 7/2009 |
| WO | 2010/006892 A1 | 1/2010 |
| WO | 2010/078365 A1 | 7/2010 |
| WO | 2010/126409 A1 | 11/2010 |

OTHER PUBLICATIONS

3GPP TSG RAN Meeting #51; "LTE RAN Enhancements for Diverse Data Applications" Kansas City, USA, Mar. 15-18, 2011; RP-110454.

An Office Action; "Notice of Reasons for Rejection," issued by the Japanese Patent Office on Feb. 24, 2015, which corresponds to Japanese Patent Application No. 2013-508658 and is related to U.S. Appl. No. 13/438,650; with English language statement of relevance.

3GPP TS 36.331; "3rd Generation Partnership Project; Technical Specification Group Radio Access Network; Evolved Universal Terrestrial Radio Access (E-UTRA); Radio Resource Control (RRC); Protocol specification (Release 10)"; 3GPP; pp. 18, 19, 34 and 35; Dec. 2010; V10.0.0; 3GPP.

The extended European search report issued by the European Patent Office on Sep. 19, 2014, which corresponds to European Patent Application No. 11863072.2-1855 and is related to U.S. Appl. No. 13/438,650.

Communication pursuant to Rules 70(2) and 70a(2) EPC issued by the European Patent Office on Oct. 8, 2014, which corresponds to European Patent Application No. 11863072.2-1855 and is related to U.S. Appl. No. 13/438,650.

Fang-Wei Li et al.; "Enhanced Discontinuous Reception Mechanism for Power Saving in TD-LTE"; 2010; pp. 682-686; IEEE.

* cited by examiner

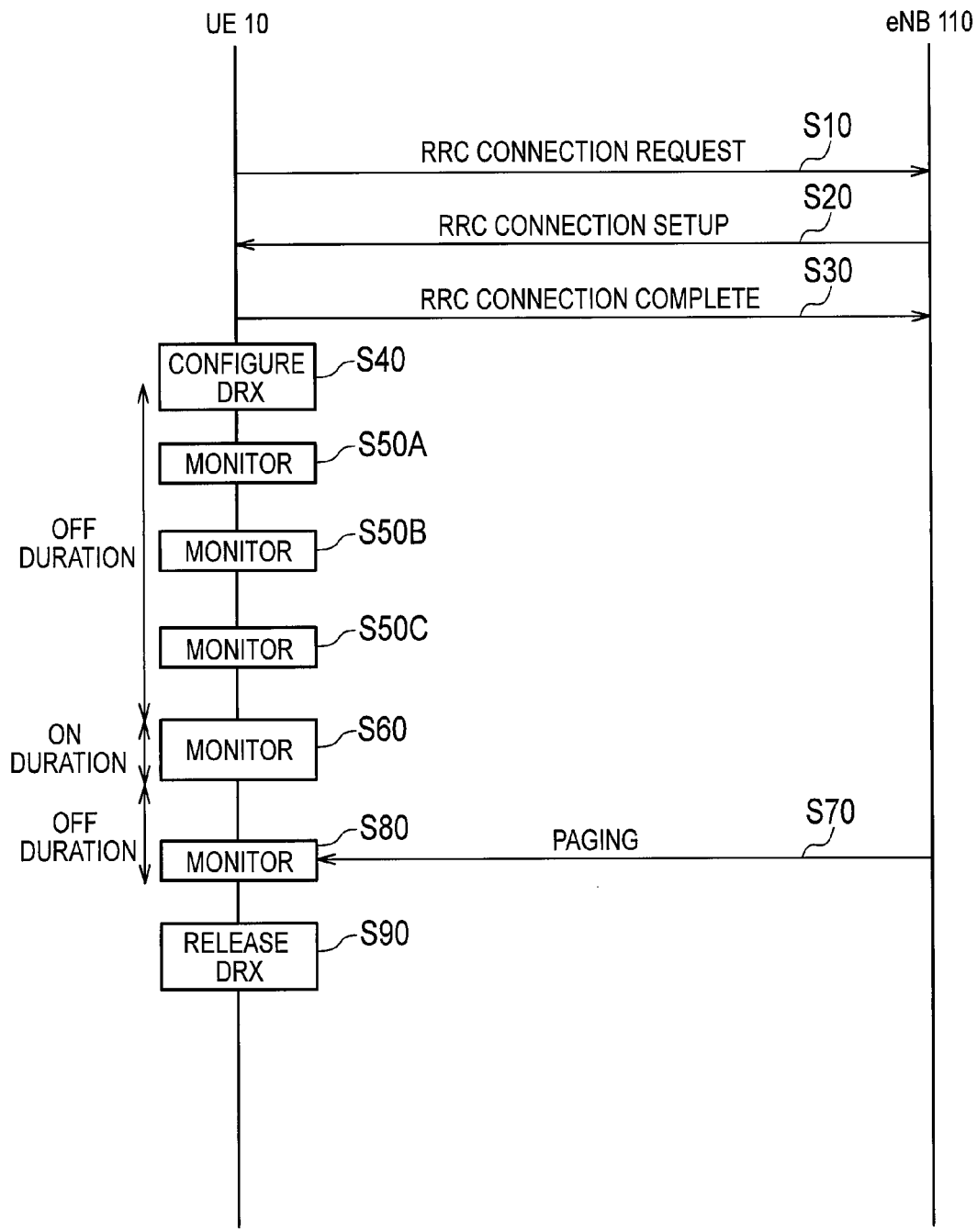

MOBILE COMMUNICATION METHOD AND RADIO TERMINAL

BACKGROUND OF THE INVENTION

1. Field of the Invention

The present invention relates to a mobile communication method, which configures a DRX cycle (a discontinuous reception cycle) having an On duration, in which a downlink signal transmitted from a serving cell is to be monitored, and an Off duration other than the On duration, and a radio terminal.

2. Description of the Related Art

In the next generation communication system such as LTE (Long Term Evolution), in order to reduce the power consumption of a radio terminal, a technology called DRX (Discontinuous Reception) is employed (for example, TS36.321 V10.0.0).

In the DRX, a DRX cycle has an On duration, in which a downlink signal (for example, PDCCH: Physical Downlink Control Channel) transmitted from a serving cell is to be monitored, and an Off duration (Opportunity for DRX) other than the On duration. A radio base station transmits a dedicated signal addressed to a radio terminal only in an On duration of the radio terminal. As described above, the configuration is such that the radio terminal may monitor the downlink signal transmitted from the radio base station, only in the On duration, and may turn off its own receiver in the Off duration. In addition, the DRX cycle may include two cycles (a short DRX cycle and a long DRX cycle). Furthermore, a DRX mode may be configured in the state in which an RRC connection is established between the radio terminal and the radio base station (RRC connected state). That is, it should be noted that the Off duration of the DRX cycle is different from an RRC idle state. In addition, in the 3GPP standard, the long DRX cycle is mandatory and the short DRX cycle is optional.

However, in recent years, there have been increased radio terminals having various applications. The application is configured to periodically transmit and receive a predetermined message such as a keep-alive message or a state update message to/from a communication correspondent such as a server. In such a case, since a control signal is transmitted and received due to the transition toward an RRC state, whenever the predetermined message is transmitted or received, a shortage of a network resource will be caused.

In this regard, in order to suppress the shortage of the network resource, the provision of a DRX cycle (for example, an extended DRX cycle) longer than the existing DRX cycle (for example, the short DRX cycle and the long DRX cycle) (for example, RP-110454) is under consideration.

However, it is assumed that the length of the extended DRX cycle is several seconds or more and the extended DRX cycle is very long as compared with the short DRX cycle, the long DRX cycle and the like. Therefore, the Off duration of the extended DRX cycle is expected to be very long.

Therefore, when the extended DRX cycle is configured, various countermeasures are necessary. For example, since it is not possible to perform an incoming-call process in the Off duration, the incoming-call process may be significantly delayed.

SUMMARY OF THE INVENTION

A mobile communication method of a first feature configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of transmitting, from the radio base station to the radio terminal, a paging signal for notifying the radio terminal of an incoming call to the radio terminal at a predetermined timing in the Off duration when the DRX cycle is configured; and a step B of monitoring, at the radio terminal, the paging signal at the predetermined timing in the Off duration when the DRX cycle is configured.

In the first feature, the mobile communication method according to claim 1, comprises: a step C of releasing, at the radio terminal, the DRX cycle in response to reception of the paging signal.

In the first feature, the step C comprises: a step of releasing the DRX cycle and monitoring the downlink signal continuously, at the radio terminal.

In the first feature, the step C comprises: a step of releasing the DRX cycle and configuring a DRX cycle shorter than the DRX cycle, at the radio terminal.

In the first feature, the step C comprises: a step of starting, at the radio terminal, a reestablish procedure for the radio base station in response to reception of the paging signal.

A radio terminal of a second feature is configured to receive a downlink signal in a mobile communication system, which configures a DRX cycle having an On duration in which the downlink signal transmitted from a serving base station is to be monitored and an Off duration other than the On duration in an RRC connected state where an RRC connection is established between the radio terminal and a radio base station. The radio terminal comprises: a control unit configured to monitor a paging signal at a predetermined timing in the Off duration when the DRX cycle is configured.

BRIEF DESCRIPTION OF THE DRAWINGS

FIG. 8 is a sequence diagram illustrating a mobile communication method according to the first embodiment.

DETAILED DESCRIPTION OF THE EMBODIMENTS

A mobile communication system according to an embodiment of the present invention is described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

[Overview of Embodiment]

A mobile communication method of an embodiment configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of transmitting, from the radio base station to the radio terminal, a paging signal for notifying the radio terminal of an incoming call to the radio terminal at a predetermined timing in the Off duration when the DRX cycle is configured; and a step B of monitoring, at the radio terminal, the paging signal at a predetermined timing in the Off duration when the DRX cycle is configured.

In the first feature, the mobile communication method according to claim 1, comprises: a step C of releasing, at the radio terminal, the DRX cycle in response to reception of the paging signal.

According to the embodiment, when a DRX cycle is configured in an RRC connected state, the radio base station transmits a paging signal at a predetermined timing even in the Off duration, and the radio terminal monitors the paging signal at a predetermined timing in an Off duration of the DRX cycle configured in the RRC connected state.

Consequently, even when a very long DRX cycle is configured, the paging signal is received in the Off duration, so that it is possible to perform an incoming-call process.

[First Embodiment]

(Mobile Communication System)

Figure 1:
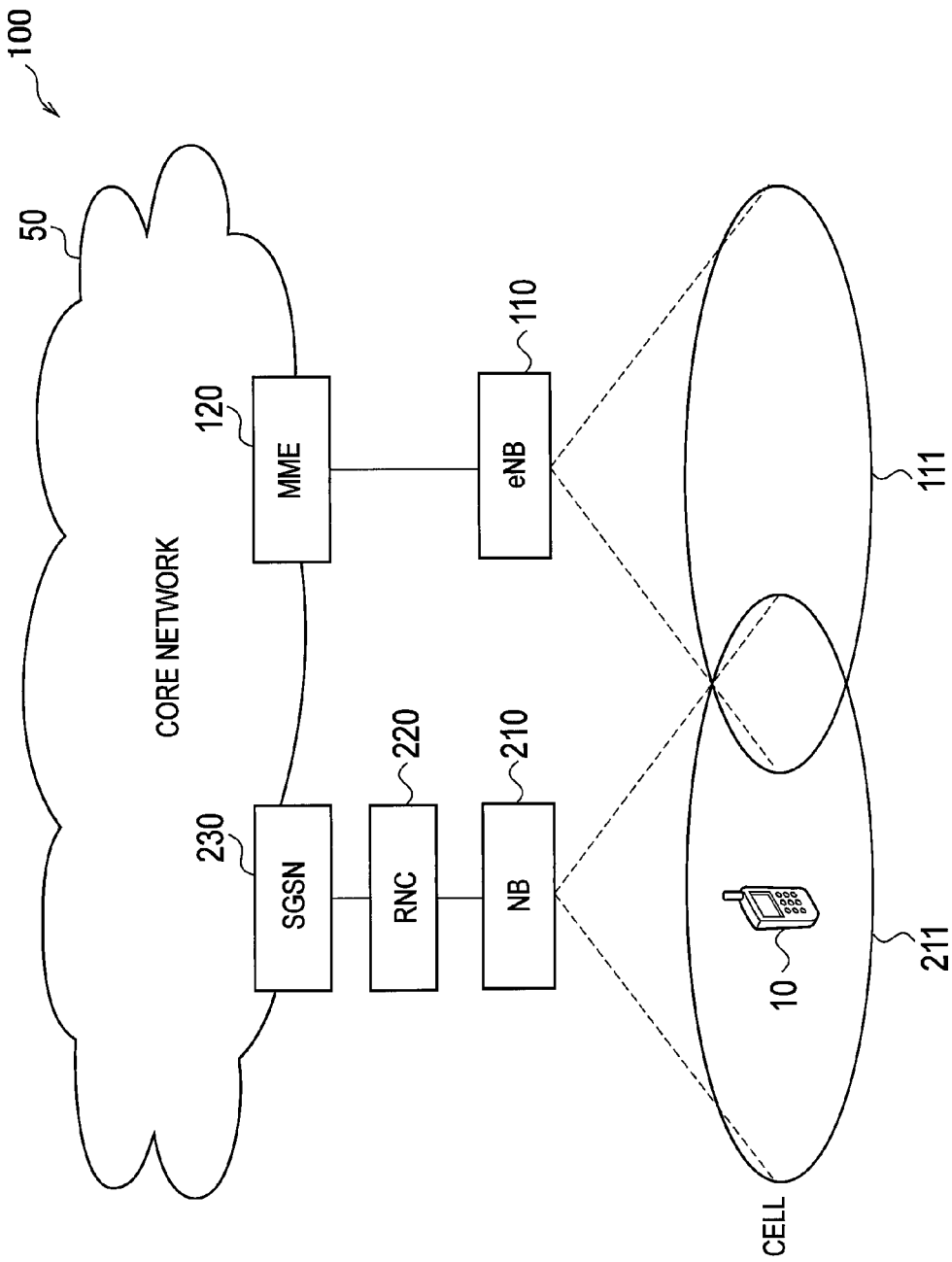
FIG. 1 is a diagram illustrating a mobile communication system 100 according to a first embodiment.

Hereinafter, a mobile communication system according to a first embodiment will be described. FIG. 1 is a diagram illustrating the mobile communication system 100 according to a first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is an LTE (Long Term Evolution)-compatible communication system. The first communication system, for example, includes a radio base station 110 (hereinafter, referred to as eNB 110) and MME 120. In addition, in the first communication system, a first RAT (EUTRAN; Evolved Universal Terrestrial Access Network) is used.

The second communication system, for example, is a WCDMA (Wideband Code Division Multiple Access)-compatible communication system. The second communication system, for example, includes a radio base station 210, RNC 220, and SGSN 230. In addition, in the second communication system, a second RAT (UTRAN; Universal Terrestrial Access Network) is used.

The UE 10 is a device (User Equipment) configured to communicate with the first communication system and the second communication system. For example, the UE 10 has a function of performing radio communication with the eNB 110, and a function of performing radio communication with the radio base station 210.

The eNB 110, having a cell 111, is a device (evolved NodeB) configured to perform radio communication with the UE 10 existing in the cell 111.

The MME 120 is a device (Mobility Management Entity) configured to manage the mobility of the UE 10 which establishes a radio connection with the eNB 110. The MME 120 is provided in the core network 50.

The radio base station 210, having a cell 211, is a device (NodeB) configured to perform radio communication with the UE 10 existing in the cell 211.

The RNC 220, connected to the radio base station 210, is a device (Radio Network Controller) configured to establish a radio connection (RRC Connection) with the UE 10 existing in the cell 211.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Hereinafter, the first communication system will be mainly described. The following description may also be applied to the second communication system. Furthermore, a cell should be understood as a function of performing radio communication with the UE 10. The cell may also be considered as a service area indicating a range communicable with the cell.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is used to transfer a control signal. The control signal, for example, includes CQI (Channel Quality Indictor), PMI (Precoding Matrix Indicator), RI (Rank Indicator), SR (Scheduling Request), and ACK/NACK.

The CQI is a signal for notifying a recommended modulation scheme and a coding rate to be used in downlink transmission. The PMI is a signal indicating a precoder matrix which is preferably used in downlink transmission. The RI is a signal indicating the number of layers (streams) to be used in downlink transmission. The SR is a signal for requesting the assignment of an uplink radio resource (a resource block which will be described later). The ACK/NACK is a signal indicating whether a signal transmitted through the downlink channel (for example, the PDSCH) has been successfully received.

The uplink shared channel is used to transfer a control signal (includes the above-mentioned control signal) and/or a data signal. For example, the uplink radio resource may be assigned only to the data signal, or assigned such that the data signal and the control signal are multiplexed.

The downlink control channel is used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted through the uplink channel.

The downlink shared channel is used to transfer a control signal and/or a data signal. For example, the downlink radio resource may be assigned only to the data signal, or assigned such that the data signal and the control signal are multiplexed.

In addition, a control signal transmitted through the downlink shared channel includes TA (Timing Advance). The TA is transmission timing correction information between the UE 10 and the eNB 110, and is measured by the eNB 110 based on an uplink signal transmitted from the UE 10.

Furthermore, a control signal transmitted through a channel, other than the downlink control channel (the PDCCH) and the downlink shared channel (the PDSCH), includes ACK/NACK. The ACK/NACK is a signal indicating whether a signal transmitted through the uplink channel (for example, the PUSCH) has been successfully received.

(Radio Frame)

Figure 2:
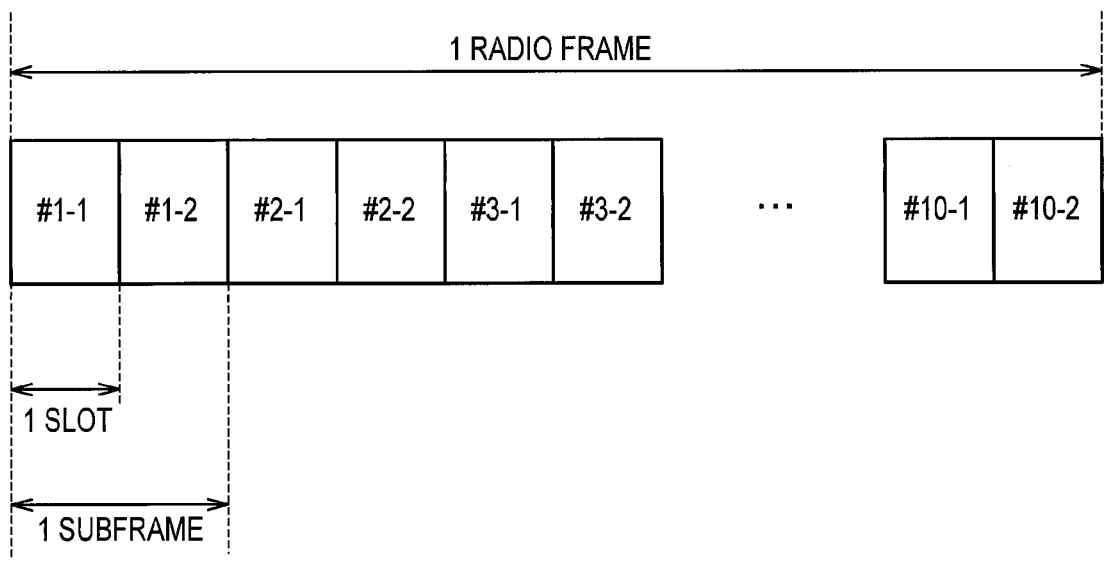
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame includes 10 subframes and one subframe includes two slots. One slot has a time length of 0.5 msec, one subframe has a time length of 1 msec, and one radio frame has a time length of 10 msec.

In addition, one slot includes a plurality of OFDM symbols (for example, six OFDM symbols or seven OFDM symbols) in the downward direction. In the same manner, one slot includes a plurality of SC-FDMA symbols (for example, six SC-FDMA symbols or seven SC-FDMA symbols) in the upward direction.

(Radio Resource)

Figure 3:
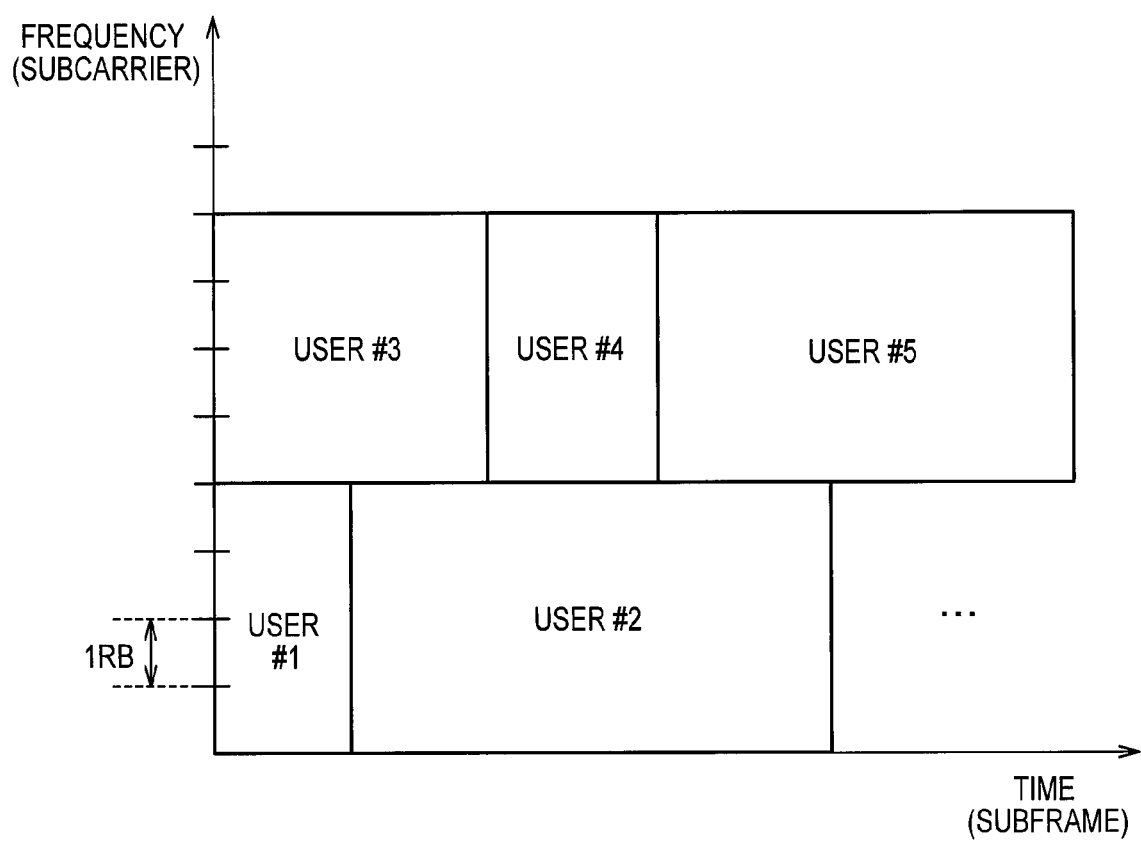
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency includes a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each resource block. Furthermore, on the frequency axis and the time axis, it is possible to divide the radio resources to assign the same to a plurality of users (for example, user #1 to user #5).

Furthermore, the radio resource is assigned by the eNB 110. The eNB 110 assigns the radio resource to each UE 10 based on the CQI, the PMI, the RI and the like.

(Discontinuous Reception)

Figure 4:
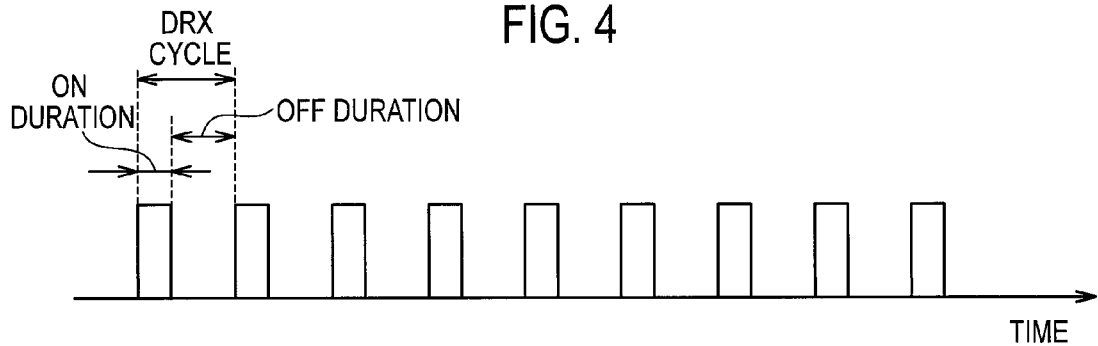
FIG. 4 is a diagram illustrating a short DRX cycle according to the first embodiment.
Figure 5:
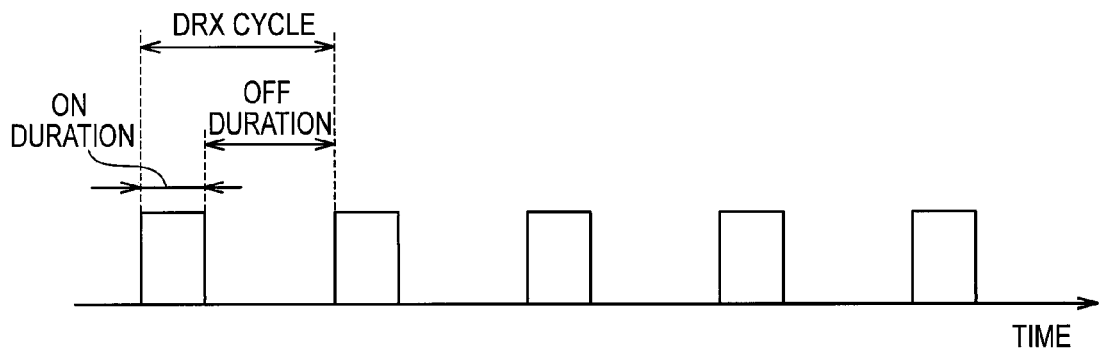
FIG. 5 is a diagram illustrating a long DRX cycle according to the first embodiment.
Figure 6:
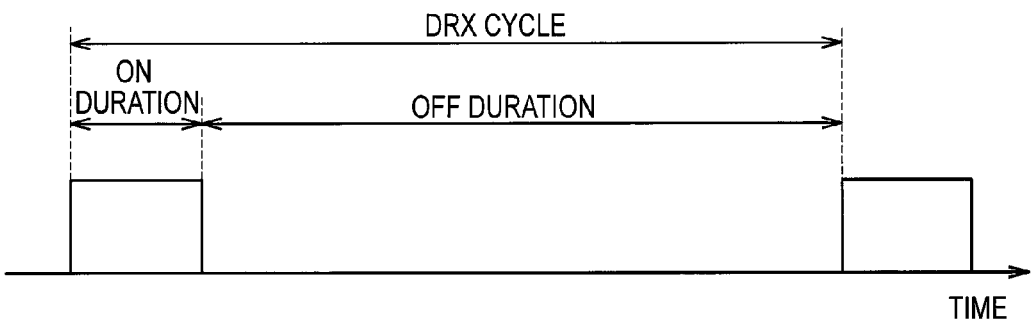
FIG. 6 is a diagram illustrating an extended DRX cycle according to the first embodiment.

Hereinafter, a discontinuous reception (DRX) will be described. FIG. 4 to FIG. 6 are diagrams explaining the discontinuous reception. In order to reduce power consumption, it is possible for the UE 10 to configure the discontinuous reception. Hereinafter, a description will be provided for the case where the discontinuous reception is configured in the state in which an RRC connection is established between the UE 10 and the eNB 110 (an RRC connected state).

As illustrated in FIG. 4 to FIG. 6, according to the discontinuous reception (DRX), a DRX cycle has an On duration, in which a downlink signal transmitted from a serving cell is to be monitored, and an Off duration (Opportunity for DRX) other than the On duration. The eNB 110 transmits a dedicated signal addressed to the UE 10 only in an On duration of the UE 10. As described above, the configuration is such that it suffices to monitor the downlink signal (for example, the PDCCH: Physical Downlink Control Channel), which is transmitted from the eNB 110, only in the On duration, and probably, the UE 10 turns off its own receiver in the Off duration.

In addition, the DRX cycle may include a plurality of types of cycles. Hereinafter, three DRX cycles (a short DRX cycle, a long DRX cycle, and an extended DRX cycle) will be described.

As illustrated in FIG. 4, the short DRX cycle is a short cycle. The length of the short DRX cycle is not particularly limited, and is the order of several milliseconds (for example, 80 msec).

For example, the short DRX cycle is configured according to a command (DRX command) received from the eNB 110. Alternatively, the short DRX cycle is configured when a predetermined period has elapsed after the downlink signal (for example, the PDCCH) is finally received. In addition, since the short DRX cycle is optional, it may not be configured.

As illustrated in FIG. 5, the long DRX cycle is longer than the short DRX cycle. The length of the long DRX cycle is not particularly limited, and is the order of several milliseconds (for example, 160 msec).

For example, when the long DRX cycle is configured, a configuration parameter (DRX Config.) is notified from the eNB 110. The long DRX cycle is configured when a predetermined period has elapsed after the downlink signal (for example, the PDCCH) is finally received. Alternatively, the long DRX cycle is configured when a predetermined period has elapsed after the short DRX cycle is configured.

As illustrated in FIG. 6, the extended DRX cycle is longer than the long DRX cycle. The length of the extended DRX cycle is not particularly limited, and is very longer than the short DRX cycle and the long DRX cycle. For example, the extended DRX cycle is the order of several seconds. For example, the extended DRX cycle is equivalent to a cycle (a Paging Channel Monitoring Cycle), in which a paging signal for notifying that the UE 10 receives an incoming call is monitored, in the state in which the RRC connection has not been established between the UE 10 and the eNB 110 (an RRC idle state). Alternatively, in the RRC idle state, the extended DRX cycle is longer than a cycle in which the paging signal for notifying that the UE 10 receives an incoming call is monitored.

For example, when the extended DRX cycle is configured, a configuration parameter (DRX Config.) is notified from the eNB 110. The extended DRX cycle is configured with the permission of the eNB 110 for a request from the UE 10. Alternatively, the extended DRX cycle is configured when a predetermined period has elapsed after the downlink signal (for example, the PDCCH) is finally received. Alternatively, the extended DRX cycle is configured when a predetermined period has elapsed after the short DRX cycle or the long DRX cycle is configured. Furthermore, in other examples, the UE 10 may recognize a static configuration parameter in advance, and the extended DRX cycle may also be configured with the permission of the eNB 110 for a request from the UE 10.

In addition, with an increase in the number of UEs 10 having various applications, the transition of an RRC state is increased due to an increase in the transmission/reception of a predetermined message. Therefore, since it is estimated that a shortage of a radio resource such as RACH (Random Access Channel) may be caused, the extended DRX cycle is configured in order to suppress the frequent transition of the RRC state in the UE 10 and to suppress the shortage of the network resource. In addition, the predetermined message includes a message, such as a keep-alive message or a state update message, which is transmitted to a communication correspondent from various applications provided in the UE 10.

(Radio Terminal)

Figure 7:
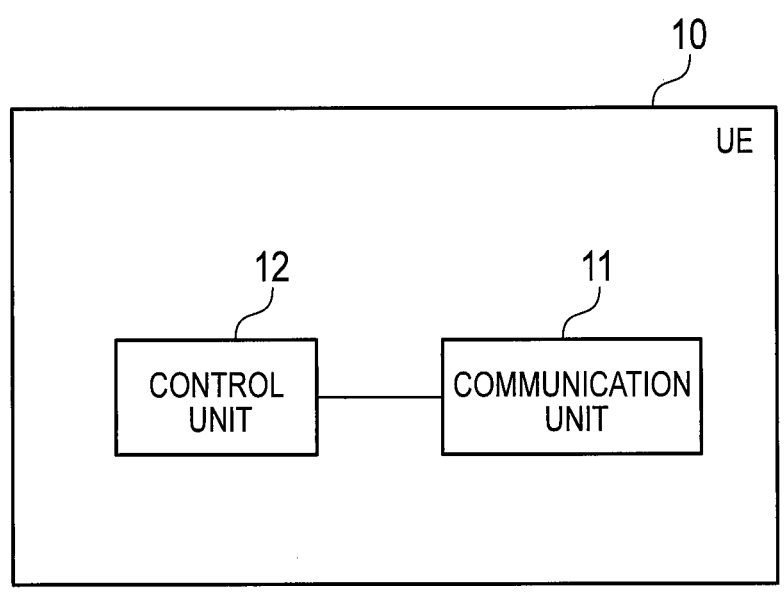
FIG. 7 is a block diagram illustrating a UE 10 according to the first embodiment.

Hereinafter, a radio terminal in the first embodiment will be described. FIG. 7 is a block diagram illustrating the UE 10 according to the first embodiment. As illustrated in FIG. 7, the UE 10 includes a communication unit 11 and a control unit 12.

The communication unit 11 receives a signal from the eNB 110 (or the radio base station 210). Alternatively, the communication unit 11 transmits a signal to the eNB 110 (or the radio base station 210). In addition, the communication unit 11, for example, has an antenna (a plurality of antennas when MIMO is used), a demodulation unit, and a modulation unit.

The control unit 12 controls the UE 10. For example, when the discontinuous reception (DRX) is configured, the control unit 12 controls the on/off of the communication unit 11. That is, in the On duration in which the downlink signal transmitted from the serving cell is to be monitored, the control unit 12 turns on the communication unit 11 and monitors the downlink signal (for example, the PDCCH) transmitted from the eNB 110. In the Off duration other than the On duration in which the downlink signal transmitted from the serving cell is to be monitored, the control unit 12 turns off the communication unit 11 and does not monitor the downlink signal (for example, the PDCCH) transmitted from the eNB 110.

Specifically, when the DRX cycle is configured in the RRC connected state, the control unit 12 monitors the paging signal at a predetermined timing in duration (that is, an Off duration) other than an On duration in which a downlink signal transmitted from a serving cell is to be monitored. In addition, the predetermined timing may be called PO (Paging Occasion) and includes one or more subframes. In addition, since the control unit 12 monitors PDCCH in the On duration of the DRX cycle configured in the RRC connected state, it is of course that it is possible to receive the paging signal.

In addition, in the conventional technology, it should be noted that the paging signal is not transmitted to the UE 10 in the RRC connected state. In the first embodiment, it should be noted that the eNB 110 transmits the paging signal to the UE 10 at a predetermined timing in the Off duration of the DRX cycle configured in the RRC connected state.

Here, only when the extended DRX cycle is configured, the control unit 12 may monitor the paging signal in the Off duration. That is, when the short DRX cycle and the long DRX cycle have been configured, the control unit 12 may not monitor the paging signal in the Off duration.

Furthermore, the control unit 12 releases the DRX cycle in response to the reception of the paging signal. For example, the control unit 12 may release the DRX cycle and enter a mode for continuously monitoring a downlink signal. Alternatively, the control unit 12 may release the DRX cycle (for example, the extended DRX cycle) and configure a DRX cycle (for example, the short DRX cycle and the long DRX cycle) shorter than the DRX cycle. Alternatively, the control unit 12 may release the DRX cycle and start a reestablish procedure for the eNB 110.

(Mobile Communication Method)

Hereinafter, the mobile communication method according to the first embodiment will be described. FIG. 8 is a sequence diagram illustrating the mobile communication method according to the first embodiment.

As illustrated in FIG. 8, in step 10, the UE 10 transmits a connection request (RRC Connection Request) to the eNB 110.

In step 20, the eNB 110 transmits a connection setup (RRC Connection Setup) to the UE 10.

In step 30, the UE 10 transmits a connection complete (RRC Connection Complete) to the eNB 110.

In step 40, the UE 10 configures DRX. For example, the UE 10 configures an extended DRX cycle.

In step 50A to step 50C, the UE 10 monitors a paging signal at a predetermined timing in duration (that is, an Off duration) other than an On duration in which a downlink signal transmitted from the serving cell is to be monitored.

In step 60, the UE 10 monitors the downlink signal (for example, PDCCH) in the On duration in which the downlink signal transmitted from the serving cell is to be monitored.

In step 70, the eNB 110 transmits the paging signal at a predetermined timing in the duration (that is, the Off duration) other than the On duration in which the downlink signal transmitted from the serving cell is to be monitored.

In step 80, the UE 10 monitors the paging signal at a predetermined timing in the On duration in which the downlink signal transmitted from the serving cell is to be monitored. Furthermore, the UE 10 receives the paging signal.

In step 90, the UE 10 releases the DRX cycle in response to the reception of the paging signal. For example, the UE 10 may release the DRX cycle and enter a mode for continuously monitoring the downlink signal. Alternatively, the UE 10 may release the DRX cycle (for example, the extended DRX cycle) and configure a DRX cycle (for example, the short DRX cycle, the long DRX cycle, and continuous reception) shorter than the DRX cycle. Alternatively, the UE 10 may release the DRX cycle and start a reestablish procedure for the eNB 110.

(Operation and Effect)

According to the embodiment, the eNB 110 transmits the paging signal at a predetermined timing in the duration (that is, the Off duration) other than the On duration in which the downlink signal transmitted from the serving cell is to be monitored, and the UE 10 monitors the paging signal at a predetermined timing in the duration (that is, the Off duration) other than the On duration in which the downlink signal transmitted from the serving cell is to be monitored.

Consequently, even when a very long DRX cycle is configured, the paging signal is received in the duration (that is, the Off duration) other than the On duration in which the downlink signal transmitted from the serving cell is to be monitored, so that it is possible to perform an incoming-call process.

Specifically, when an extended DRX cycle having a very long DRX cycle is configured, it is effective to monitor the paging signal at a predetermined timing in the duration (that is, the Off duration) other than the On duration in which the downlink signal transmitted from the serving cell is to be monitored.

As described above, when the frequency of transmission/reception of a predetermined message is lower than a cycle (a Paging Channel Monitoring Cycle) in which the paging signal is monitored in an RRC idle state, the extended DRX cycle is configured such that frequent transition of the UE 10 to the RRC state is suppressed, preventing a shortage of the network resource will be suppressed.

[Other Embodiments]

The present invention is explained through the above embodiment, but it must not be understood that this invention is limited by the statements and the drawings constituting a part of this disclosure. From this disclosure, a variety of alternate embodiments, examples, and applicable techniques will become apparent to one skilled in the art.

For example, when the frequency of transmission/reception of a predetermined message is lower than a cycle (a Paging Channel Monitoring Cycle) for monitoring the paging signal in an RRC idle state, the extended DRX cycle is configured such that the power consumption of the UE 10 is reduced. Alternatively, when power consumption, which is required in the On duration in which the downlink signal transmitted from the serving cell is to be monitored, is higher than power consumption required for monitoring the paging signal, the extended DRX cycle is configured such that the power consumption of the UE 10 is reduced.

Particularly not mentioned in the embodiment, but a configuration (Configuration) for monitoring the paging signal in the duration (that is, the Off duration) other than the On duration, in which the downlink signal transmitted from the serving cell is to be monitored, is transmitted from the eNB 110 to the UE 10 before the DRX cycle is configured. The configuration for monitoring the paging signal, for example, includes conditions for starting a process for monitoring the paging signal and a monitoring cycle of the paging signal in the duration (that is, the Off duration) other than the On duration in which the downlink signal transmitted from the serving cell is to be monitored. The configuration for monitoring the paging signal, for example, may be notified to the UE 10 through RRC signaling, or may be notified to the UE 10 through a broadcast channel. The broadcast channel is broadcasted from the eNB 110 and transfers MIB (Master Information Block) or SIB (System Information Block).

As an example, when a DRX cycle (specifically, an extended DRX cycle) is configured, there is considered a case in which a setting request of the DRX cycle is transmitted from the UE 10 to the eNB 110 and setting permission of the DRX cycle is transmitted from the eNB 110 to the UE 10. In such a case, it is considered that the configuration for monitoring the paging signal is included in the setting permission transmitted from the eNB 110 to the UE 10.

Particularly not mentioned in the embodiment, but, when the extended DRX cycle includes a cycle (a Paging Channel Monitoring Cycle) for monitoring the paging signal, the PDCCH may be monitored if a monitoring timing of the paging signal overlaps the On duration, and only the paging signal may be monitored if the monitoring timing of the paging signal overlaps the Off duration.

In addition, in order to receive the paging signal, it is necessary to receive a dedicated PDCCH. However, in the embodiment, the reception of such a dedicated PDCCH will be omitted.

What is claimed is:

1. A mobile communication method, which configures a discontinuous reception (DRX) cycle having an On duration in which a downlink signal transmitted from a serving base station is to be monitored and an Off duration other than the On duration in a radio resource control (RRC) connected state where an RRC connection is established between the a radio terminal and a radio base station, the DRX cycle comprising:

a first DRX cycle that is a mandatory function;

a second DRX cycle that is an optional function and configures a shorter cycle than the first DRX cycle: and a third DRX cycle that configures a longer cycle than the first DRX cycle, the mobile communication method comprising:

transmitting, from the radio base station to the radio terminal, a paging signal for notifying the radio terminal of an incoming call to the radio terminal at a predetermined timing in the Off duration when the third DRX cycle is configured; and monitoring, at the radio terminal, the paging signal by turning on the receiver at the predetermined timing in the Off duration when the third DRX cycle is configured.

2. The mobile communication method according to claim 1, comprising:

releasing, at the radio terminal, the DRX cycle in response to reception of the paging signal.

3. The mobile communication method according to claim 2, wherein releasing the DRX cycle comprises releasing the DRX cycle and monitoring the downlink signal continuously, at the radio terminal.

4. The mobile communication method according to claim 2, wherein releasing the DRX cycle comprises releasing the DRX cycle and configuring a DRX cycle shorter than the DRX cycle, at the radio terminal.

5. The mobile communication method according to claim 2, wherein releasing the DRX cycle comprises starting, at the radio terminal, a reestablish procedure for the radio base station in response to reception of the paging signal.

6. A radio terminal comprising:

a receiver configured to receive a downlink signal in a mobile communication system, which configures a discontinuous reception (DRX) cycle having an On duration in which the downlink signal transmitted from a serving base station is to be monitored and an Off duration other than the On duration in a radio resource control (RRC) connected state where an RRC connection is established between the radio terminal and a radio base station, the DRX cycle comprising:

a first DRX cycle that is a mandatory function:

a second DRX cycle that is an optional function and configures a shorter cycle than the first DRX cycle; and a third DRX cycle that configures a longer cycle than the first DRX cycle, the radio terminal further comprising:

processor configured to monitor a paging signal at a predetermined timing in the Off duration when the third DRX cycle is configured.

* * * * *